US012384290B2

(12) United States Patent
Yamamoto et al.

(10) Patent No.: US 12,384,290 B2
(45) Date of Patent: Aug. 12, 2025

(54) INFORMATION DETECTING DEVICE AND ROAD-SURFACE DRAWING DEVICE

(71) Applicant: KOITO MANUFACTURING CO., LTD., Tokyo (JP)

(72) Inventors: Shuki Yamamoto, Shizuoka (JP); Akinori Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 403 days.

(21) Appl. No.: 18/016,835

(22) PCT Filed: Jul. 16, 2021

(86) PCT No.: PCT/JP2021/026803
§ 371 (c)(1),
(2) Date: Jan. 18, 2023

(87) PCT Pub. No.: WO2022/019233
PCT Pub. Date: Jan. 27, 2022

(65) Prior Publication Data
US 2023/0295886 A1  Sep. 21, 2023

(30) Foreign Application Priority Data
Jul. 22, 2020  (JP) .................. 2020-125574

(51) Int. Cl.
*B60Q 1/24* (2006.01)
*B60Q 1/50* (2006.01)

(52) U.S. Cl.
CPC .............. *B60Q 1/249* (2022.05); *B60Q 1/50* (2013.01); *B60Q 1/547* (2022.05); *B60Q 2400/50* (2013.01)

(58) Field of Classification Search
CPC .......... B60Q 1/249; B60Q 1/50; B60Q 1/547; B60Q 2400/50; E01C 23/163; G05B 15/02
(Continued)

(56) References Cited

U.S. PATENT DOCUMENTS

2005/0278520 A1  12/2005  Hirai et al.
2010/0156616 A1*  6/2010  Aimura ................... G06T 7/593
340/436
(Continued)

FOREIGN PATENT DOCUMENTS

EP  3871924 A1  9/2021
JP  8-16531 A  1/1996
(Continued)

OTHER PUBLICATIONS

International Search Report (PCT/ISA/210) dated Sep. 7, 2021 issued by the International Searching Authority in International Application No. PCT/JP2021/026803.
(Continued)

*Primary Examiner* — Chun Cao
(74) *Attorney, Agent, or Firm* — Sughrue Mion, PLLC

(57) ABSTRACT

A light emitter emits detecting light to a detecting area located outside a monitoring device. A light receiver detects reflected light that is generated in accordance with reflection of the detecting light by an object located in the detecting area. A first processor is capable of executing first detecting processing that is a part of information detecting processing for detecting information of the object based on the reflected light. A second processor is capable of executing second detecting processing that is a part of the information detecting processing, and is at least partially different from the first detecting processing. A controller changes a ratio of each of
(Continued)

the first detecting processing and the second detecting processing to the information detecting processing.

7 Claims, 13 Drawing Sheets

(58) Field of Classification Search
USPC .................................................. 700/2, 12
See application file for complete search history.

(56) References Cited

U.S. PATENT DOCUMENTS

| | | | |
|---|---|---|---|
| 2013/0343071 A1* | 12/2013 | Nagaoka | B60Q 1/085 362/466 |
| 2015/0258928 A1* | 9/2015 | Goto | B60Q 1/525 701/49 |
| 2016/0298809 A1 | 10/2016 | Lutz et al. | |
| 2017/0057501 A1 | 3/2017 | Schiraga | |
| 2017/0270375 A1 | 9/2017 | Grauer | |
| 2019/0163254 A1 | 5/2019 | Dewey et al. | |
| 2019/0187765 A1 | 6/2019 | Ashwood et al. | |
| 2019/0270405 A1* | 9/2019 | Fukumoto | B60Q 1/507 |
| 2019/0283658 A1 | 9/2019 | Furui | |
| 2020/0010079 A1* | 1/2020 | Ito | B60Q 1/1423 |

FOREIGN PATENT DOCUMENTS

| | | |
|---|---|---|
| JP | 2019-164916 A | 9/2019 |
| JP | 2020-75708 A | 5/2020 |
| WO | 2018/128655 A2 | 7/2018 |
| WO | 2019/234503 A2 | 12/2019 |

OTHER PUBLICATIONS

Written Opinion (PCT/ISA/237) dated Sep. 7, 2021 issued by the International Searching Authority in International Application No. PCT/JP2021/026803.
Communication dated Oct. 27, 2023, issued by European Patent Office in European Patent Application No. 21845899.0.

* cited by examiner

INFORMATION DETECTING DEVICE AND ROAD-SURFACE DRAWING DEVICE

This is a National Stage of PCT Application No. PCT/JP2021/026803 filed Jul. 16, 2021, claiming priority based on Japan Patent Application No. 2020-125574 filed Jul. 22, 2020.

FIELD

The presently disclosed subject matter relates to an information detecting device adapted to be installed in a monitoring device for detecting external information of the monitoring device. The presently disclosed subject matter also relates to a road-surface drawing device adapted to be installed in a monitoring device to draw a prescribed image on a road surface located outside the monitoring device.

BACKGROUND

Patent Document 1 discloses a LiDAR (Light Detection and Ranging) sensor as an example of an information detecting device for detecting an object located outside a mobile entity as an example of a monitoring device.

Patent Document 2 discloses a road-surface drawing device for drawing a marker image on a road surface by controlling on/off of a light source installed in a mobile entity as an example of a monitoring device as well as a projecting direction of light emitted from the light source.

CITATION LIST

Patent Document

Patent Document 1: Japanese Patent Publication No. 2019-164916 A
Patent Document 2: Japanese Patent Publication No. 2020-075708 A

SUMMARY

Technical Problem

It is demanded to suppress the generation of heat during the execution of the processing for detecting the external information of the monitoring device (first demand). In addition, it is demanded to suppress heat generation caused by the execution of the processing for drawing an image on a road surface located outside the monitoring device (second demand).

Solution to Problem

In order to meet the demand described above, an illustrative aspect of the presently disclosed subject matter provides an information detecting device adapted to be installed in a monitoring device, comprising:
  at least one light emitter configured to emit detecting light to a detecting area located outside the monitoring device;
  at least one light receiver configured to detect reflected light that is generated in accordance with reflection of the detecting light by an object located in the detecting area;
  a first processor capable of executing first detecting processing that is a part of information detecting processing for detecting information of the object based on the reflected light;
  a second processor capable of executing second detecting processing that is a part of the information detecting processing, and is at least partially different from the first detecting processing; and
  a controller configured to change a ratio of each of the first detecting processing and the second detecting processing to the information detecting processing.

As the first detecting processing is executed, the first processor generates heat. Similarly, in accordance with the execution of the second detecting processing, the second processor generates heat. However, since the processing load in each processor can be suppressed by the information detecting processing being shared by the first processor and the second processor, the total amount of heat generation is suppressed as compared with the case where a single processor is driven non-intermittently. In addition, the ratio of each of the first detecting processing and the second detecting processing to the object detecting processing can be appropriately changed by the controller according to the thermal environment wherein each of the first processor and the second processor is disposed. Accordingly, it is possible to more appropriately suppress the generation of heat during the execution of the object detecting processing.

In order to meet the demand described above, an illustrative aspect of the presently disclosed subject matter provides a road-surface drawing device adapted to be installed in a monitoring device, comprising:
  at least one light source configured to emit visible light;
  a projector configured to project the visible light on a road surface located outside the monitoring device;
  a first processor capable of executing first drawing processing that is a part of road-surface drawing processing for controlling on/off of the light source and a projecting direction of the visible light;
  a second processor capable of executing second drawing processing that is a part of the road-surface drawing processing, and is at least partially different from the first drawing processing; and
  a controller configured to change a ratio of each of the first drawing processing and the second drawing processing to the road-surface drawing processing.

As the first drawing processing is executed, the first processor generates heat. Similarly, in accordance with the execution of the second drawing processing, the second processor generates heat. However, since the processing load in each processor can be suppressed by the road-surface drawing processing being shared by the first processor and the second processor, the total amount of heat generation is suppressed as compared with the case where a single processor is driven non-intermittently. In addition, the ratio of each of the first drawing processing and the second drawing processing to the road-surface drawing processing can be appropriately changed by the controller according to the thermal environment wherein each of the first processor and the second processor is disposed. Accordingly, it is possible to more appropriately suppress the generation of heat during the execution of the road-surface drawing processing.

DESCRIPTION OF EMBODIMENTS

Examples of embodiments will be described below in detail with reference to the accompanying drawings. In each of the drawings used in the following descriptions, the scale is appropriately changed in order to make each item have a recognizable size.

In the accompanying drawings, an arrow F represents a forward direction of the illustrated configuration. An arrow B represents a rearward direction of the illustrated configuration. An arrow U represents an upward direction of the illustrated configuration. An arrow D represents a downward direction of the illustrated configuration. An arrow L represents a leftward direction of the illustrated configuration. An arrow R represents a rightward direction of the illustrated configuration.

Figure 1:
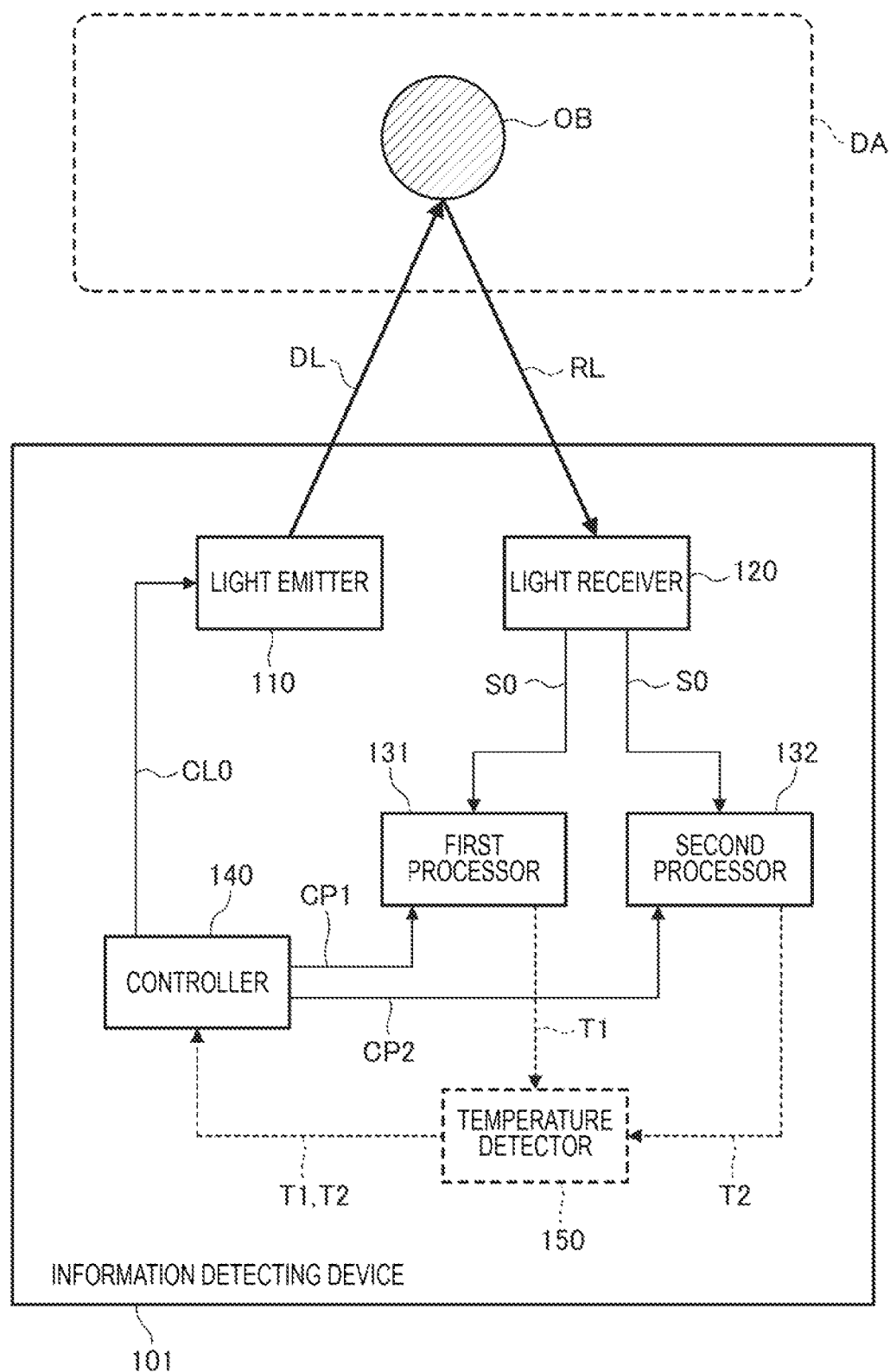
FIG. 1 illustrates a functional configuration of an information detecting device according to a first embodiment.
Figure 2:
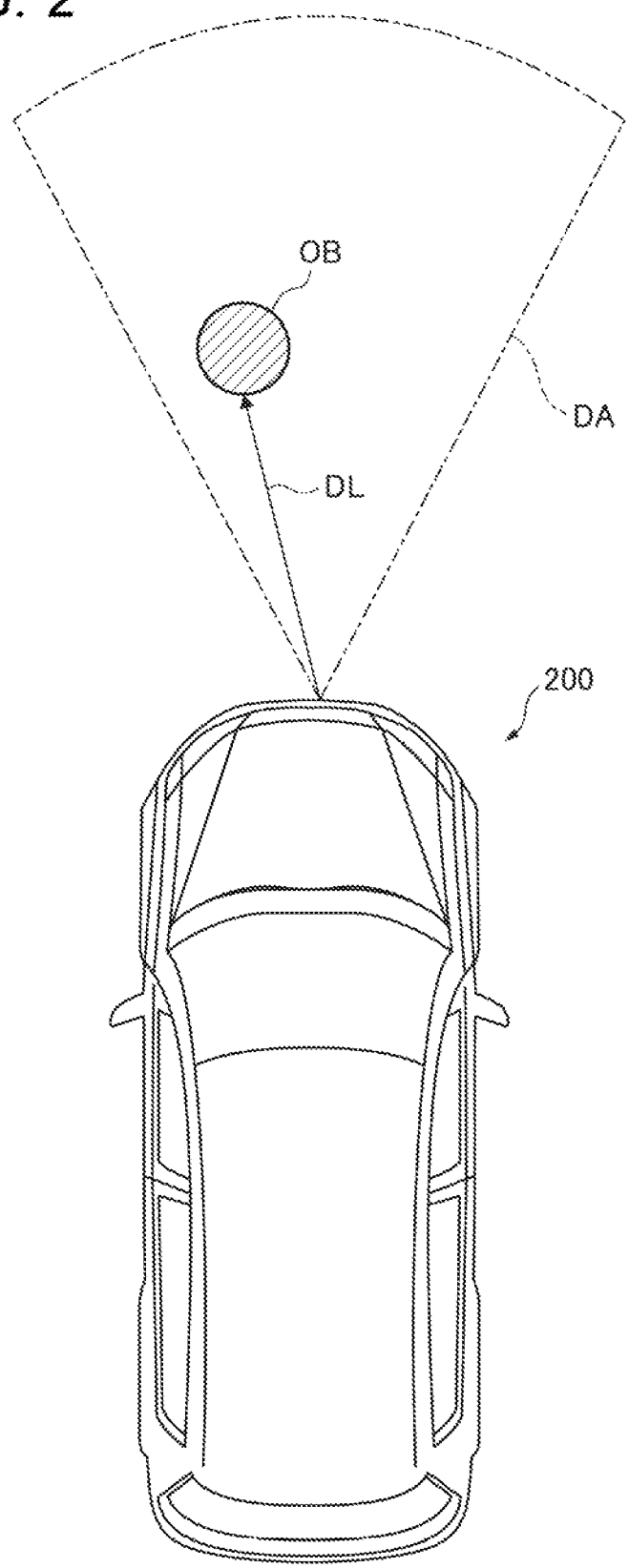
FIG. 2 illustrates a vehicle in which the information detecting device of FIG. 1 is to be installed.
Figure 2:
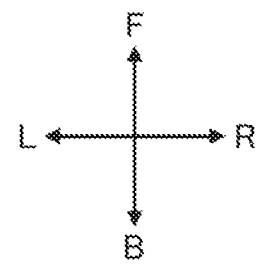

FIG. 1 illustrates a functional configuration of an information detecting device 101 according to a first embodiment. The information detecting device 101 is configured to be mounted at an appropriate position in a vehicle 200 illustrated in FIG. 2. The position is defined as a position at which information of an object OB located in a detecting area DA that is set outside the vehicle 200 can be sensed. The vehicle 200 is an example of a mobile entity. The vehicle 200 is also an example of a monitoring device.

As illustrated in FIG. 1, the information detecting device 101 includes a light emitter 110. The light emitter 110 includes a light source that emits detecting light DL toward the detecting area DA. The light source may be, for example, a semiconductor light emitting element that emits infrared light. Examples of the semiconductor light emitting device include a light emitting diode and a laser diode.

Figure 3:
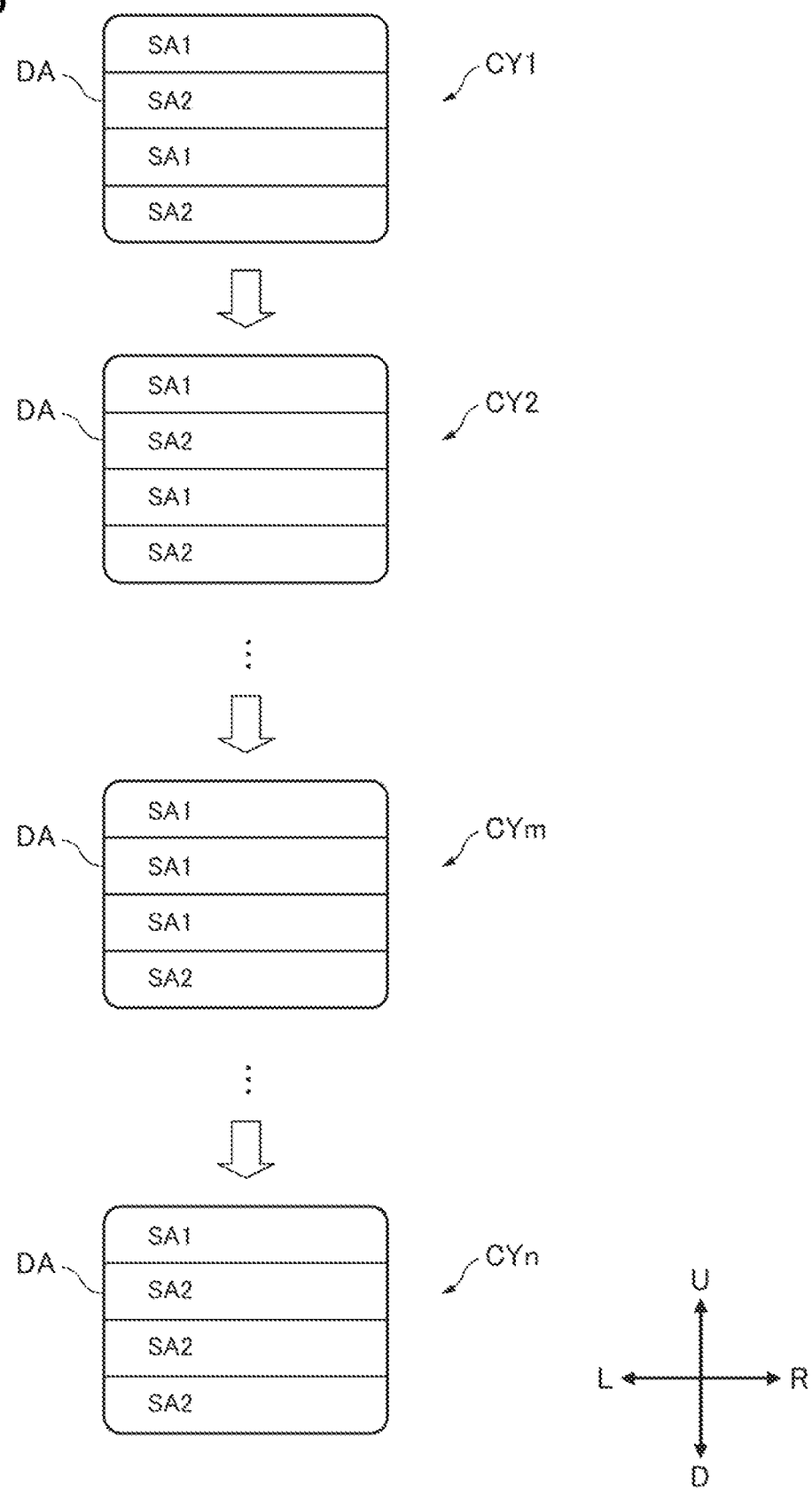
FIG. 3 illustrates an exemplary operation of the information detecting device of FIG. 1.

As illustrated in FIG. 3, the detecting area DA is spreading two-dimensionally in an up-down direction and a left-right direction. The light emitter 110 may include a reflective optical system that changes the traveling direction of the detecting light DL in the up-down direction and the left-right direction so that the detecting area DA is two-dimensionally scanned by the detecting light DL.

The combination of the light source and the reflective optical system can be appropriately changed. As an example, it is possible to adopt a configuration wherein the traveling direction of the detecting light DL emitted from each of a plurality of light sources arranged in the up-down direction is changed in the left-right direction by the reflective optical system, so that the two-dimensional scanning of the detecting area DA is realized. As another example, it is possible to adopt a configuration wherein the traveling direction of the detecting light DL emitted from each of a plurality of light sources arranged in the left-right direction is changed in the up-down direction by the reflective optical system, so that the two-dimensional scanning of the detecting area DA is realized.

Since the configuration per se for realizing the two-dimensional scanning as described above is well known, detailed descriptions thereof will be omitted.

As another example, the light emitter 110 may include a plurality of light sources arranged in the up-down direction and the left-right direction. The number of light sources corresponds to the resolution defined for the detecting area DA. In this case, the reflective optical system for scanning can be omitted.

As illustrated in FIG. 1, the information detecting device 101 includes a light receiver 120. When the detecting light DL is reflected by an object OB located in the detecting area DA, reflected light RL is generated. The light receiver 120 includes a light receiving element that detects the reflected light RL. Examples of the light receiving element include a photodiode, a phototransistor, and a photo resistor. The light receiver 120 is configured to output a detection signal S0 corresponding to received light intensity of the reflected light RL. The detection signal S0 may be an analog signal or a digital signal.

In a case where the light emitter 110 includes a plurality of light sources, the light receiver 120 may also include a plurality of light receiving elements. The direction in which the light receiving elements are arrayed may correspond to the direction in which the light sources are arrayed. However, in a case where the light receiver 120 includes an appropriate reflective optical system, the number of light sources and the number of light receiving elements need not necessarily coincide with each other. For example, it is possible to adopt a reflective optical system configured to sequentially reflect reflected light RL generated from detecting light DL emitted from each of a plurality of light sources toward a single light receiving element. Since such a reflective optical system is also well known, detailed descriptions thereof will be omitted.

The information detecting device 101 includes a first processor 131 and a second processor 132. The first processor 131 and the second processor 132 are configured to execute object detecting processing for detecting an object OB located in the detecting area DA based on the detection signal S0 outputted from the light receiver 120. In a case where pulsed detecting light DL is emitted from the light emitter 110 in a specific direction toward the detecting area DA, the presence of an object OB in that direction can be detected based on a fact that the intensity of the detection signal S0 exhibits a pulsed change. In addition, the distance to the object OB in that direction can be detected based on a time length from when the detecting light DL is emitted from the light emitter 110 to when the reflected light RL is detected by the light receiver 120. By accumulating distance information based on the detection signal S0 while changing the traveling direction of the detecting light DL, a surface shape of the object OB can also be detected. The object detecting processing is an example of information detecting processing.

Specifically, as illustrated in FIG. 3, the detecting area DA includes a first sub-area SA1 and a second sub-area SA2. The first sub-area SA1 is an area subjected to the object detecting processing executed by the first processor 131. The second sub-area SA2 is an area that is to be subjected to the object detecting processing executed by the second processor 132. In the following descriptions, the object detecting processing executed by the first processor 131 will be referred to as a "first detecting processing". Similarly, the object detecting processing executed by the second processor 132 is referred to as a "second detecting processing". In other words, each of the first detecting processing and the second detecting processing is a part of the object detecting processing.

A period from when the detecting light DL emitted from the light emitter 110 starts scanning the detecting area DA to when the scanning of the entire detecting area DA is completed corresponds to one cycle of the object detecting processing.

In a first cycle CY1 illustrated in FIG. 3, the first processor 131 detects the presence or absence of the reflected light RL and a time length until the reflected light RL is detected while the detecting light DL scans a first sub-area SA1 located uppermost. The second processor 132 detects the presence or absence of the reflected light RL and a time length until the reflected light RL is detected while the detecting light DL scans a second sub-area SA2 located below the first sub-area SA1. Similarly, the first processor 131 detects the presence or absence of the reflected light RL and a time length until the reflected light RL is detected while the detecting light DL scans a first sub-area SA1 located below the second sub-area SA2. The second processor 132 detects the presence or absence of the reflected light RL and a time length until the reflected light RL is detected while the detecting light DL scans a second sub-area SA2 located lowermost. The same processing is repeated also in a second cycle CY2 subsequent to the first cycle CY1.

As illustrated in FIG. 1, the information detecting device 101 includes a controller 140. The controller 140 includes an output interface configured to output a light emission control signal CL0 for controlling the operation of the light emitter 110. The light emission control signal CL0 may include information indicative of a scanning position of the detecting light DL in the detecting area DA. The light emitter 110 is configured to emit detecting light DL based on the light emission control signal CL0. The light emission control signal CL0 may be an analog signal or a digital signal. In a case where the light emission control signal CL0 is an analog signal, the output interface of the controller 140 is provided with an appropriate conversion circuit including a D/A converter.

The output interface of the controller 140 is configured to additionally output a first processing control signal CP1 for controlling the operation of the first processor 131 and a second processing control signal CP2 for controlling the operation of the second processor 132. The first processor 131 is configured to execute a first detecting processing in response to receiving of the first processing control signal CP1. The second processor 132 is configured to execute a second detecting processing in response to receiving of the second processing control signal CP2. The controller 140 is configured to provide each of the first processing control signal CP1 and the second processing control signal CP2 so as to include the information indicative of the scanning position. The position of the object OB and the distance to the object OB in the detecting area DA described above are specified by each of the first processor 131 and the second processor 132 based on the information indicative of the scanning position.

In other words, the controller 140 outputs the first processing control signal CP1 while the detecting light DL scans the first sub-area SA1. Similarly, the controller 140 outputs the second processing control signal CP2 while the detecting light DL scans the second sub-area SA2.

The controller 140 is configured to change a ratio of each of the first detecting processing and the second detecting processing to the object detecting processing. Specifically, the controller 140 changes a ratio of each of the first sub-area SA1 and the second sub-area SA2 to the detecting area DA.

In the first cycle CY1 and the second cycle CY2 illustrated in FIG. 3, the ratio of each of the first sub-area SA1 and the second sub-area SA2 to the detecting area DA is equal. In the m-th cycle CYm, the controller 140 increases the ratio of the first sub-area SA1 to the detecting area DA. Accordingly, the ratio of the second sub-area SA2 to the detecting area DA is decreased. As a result, the ratio of the first detecting processing executed by the first processor 131 to the object detecting processing is made higher than the ratio of the second detecting processing executed by the second processor 132 to the object detecting processing.

In the n-th cycle CYn illustrated in FIG. 3, the controller 140 increases the ratio of the second sub-area SA2 to the detecting area DA. Accordingly, the ratio of the first sub-area SA1 to the detecting area DA is decreased. As a result, the ratio of the second detecting processing executed by the second processor 132 to the object detecting processing is made higher than the ratio of the first detecting processing executed by the first processor 131 to the object detecting processing.

Figure 4:
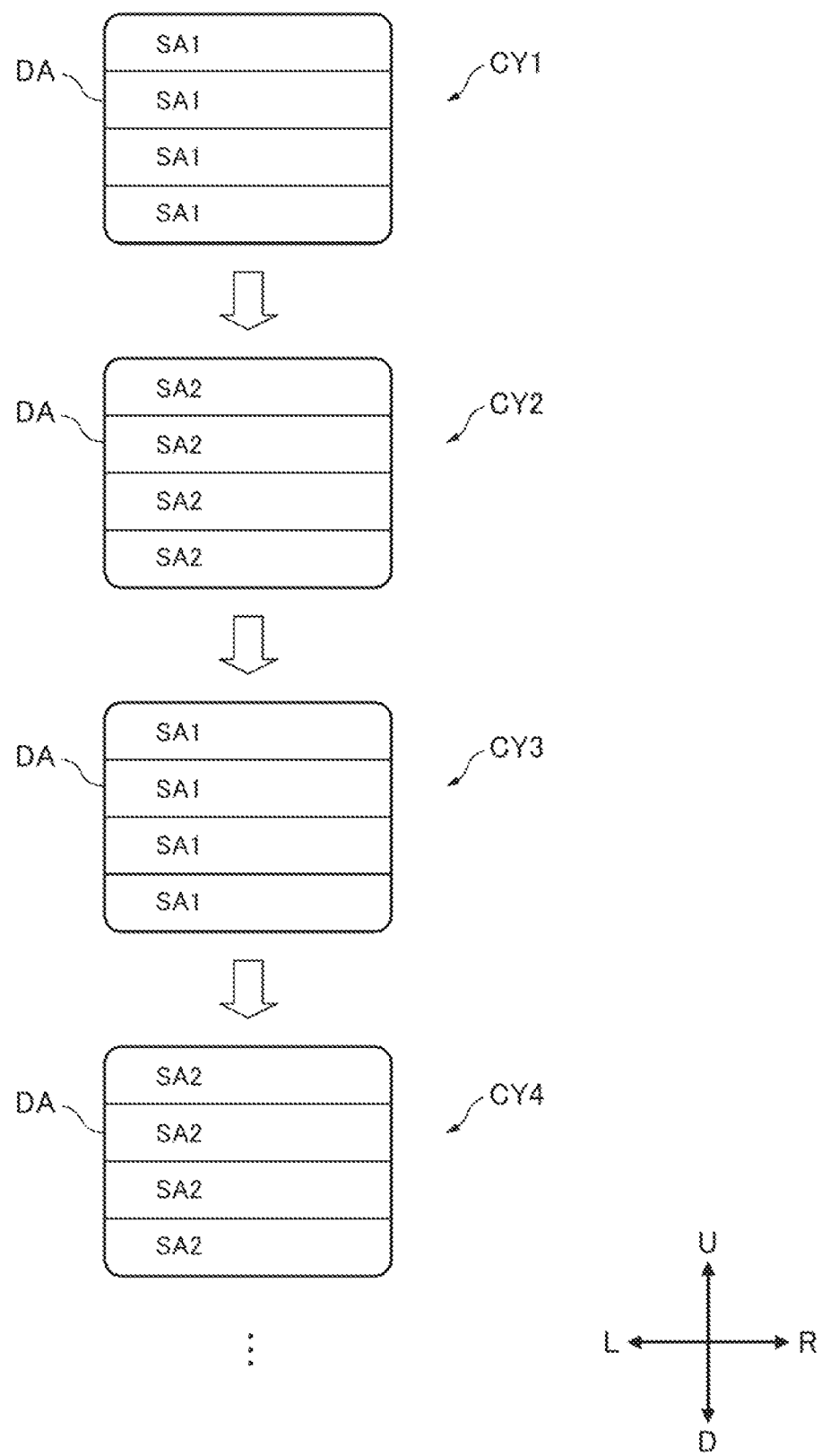
FIG. 4 illustrates another exemplary operation of the information detecting device of FIG. 1.

The detecting area DA subjected to the object detecting processing of one cycle does not necessarily have to include both the first sub-area SA1 and the second sub-area SA2. FIG. 4 illustrates another example of the ratio changing processing that can be executed by the controller 140.

In the first cycle CY1, the detecting area DA includes only the first sub-area SA1. Accordingly, during the first cycle CY1, the controller 140 outputs only the first processing control signal CP1, so that only the first detecting processing with the first processor 131 is executed.

In the second cycle CY2, the detecting area DA includes only the second sub-area SA2. Accordingly, during the second cycle CY2, the controller 140 outputs only the second processing control signal CP2, so that only the second detecting processing with the second processor 132 is executed.

The ratio of each of the first sub-area SA1 and the second sub-area SA2 to the detecting area DA in each of the third cycle CY3 and the fourth cycle CY4 is the same as that of the first cycle CY1 and the second cycle CY2, respectively. Accordingly, in this example, the first detecting processing with the first processor 131 and the second detecting processing with the second processor 132 are alternately executed every cycle of the object detecting processing.

Figure 5:
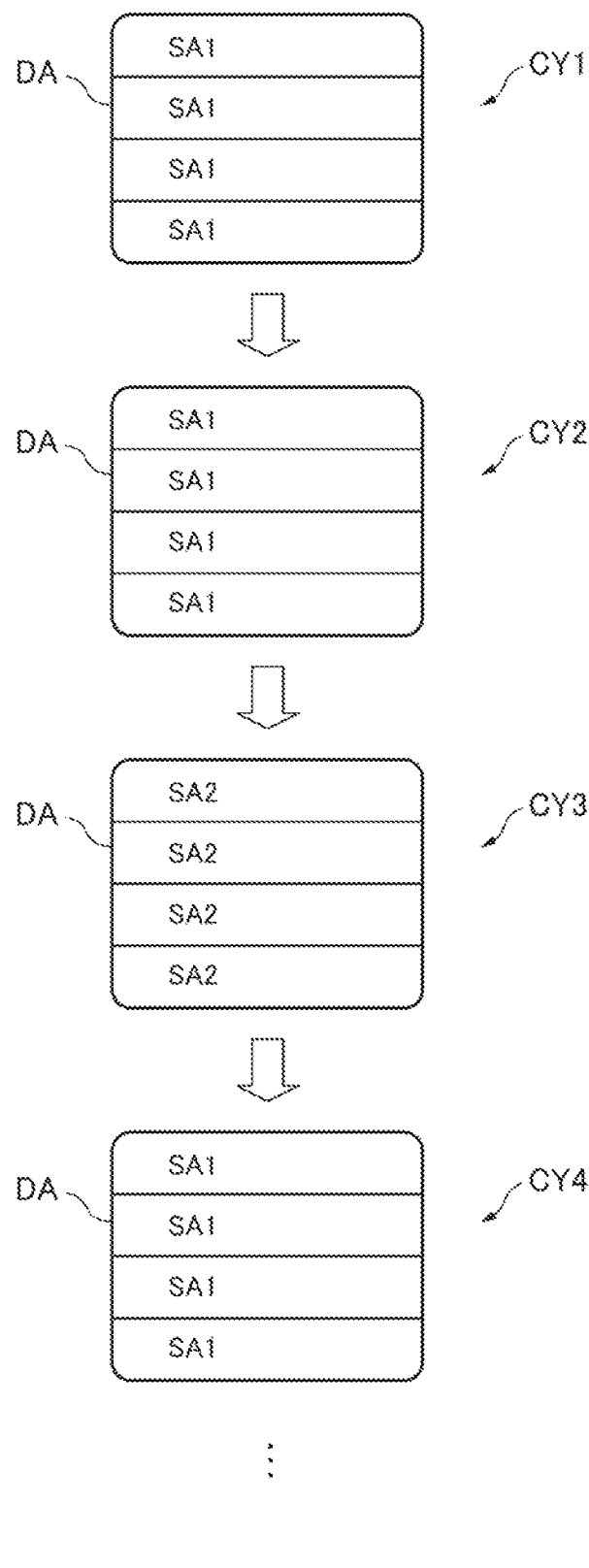
FIG. 5 illustrates another exemplary operation of the information detecting device of FIG. 1.
Figure 5:
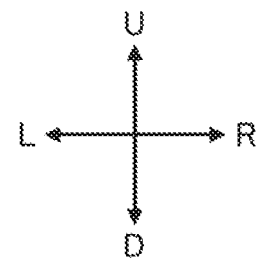

FIG. 5 illustrates another example of the ratio changing processing that can be executed by the controller 140. In this example, as a basic operation, only the first detecting processing is executed by the first processor 131 every cycle of the object detecting processing. On the other hand, in a specific cycle of the object detecting processing, only the second detecting processing with the second processor 132 is executed in an auxiliary manner. In this example, in the third cycle CY3, only the second detecting processing with the second processor 132 is executed. The timing at which the controller 140 executes the second detecting processing can be appropriately determined.

Each of the first processor 131, the second processor 132, and the controller 140 can be implemented by an exclusive integrated circuit including a processor capable of executing each of the above-described processing. Examples of the exclusive integrated circuit include a microcontroller, an ASIC, and an FPGA. The controller 140 may be configured to include a general-purpose microprocessor operating in conjunction with a general-purpose memory. Examples of the general-purpose microprocessor include a CPU, an MPU, and a GPU. Examples of the general-purpose memory include a ROM and a RAM. The first processor 131 and the second processor 132 are provided as separate device packages. The controller 140 may share a device package with one of the first processor 131 and the second processor 132.

As the first detecting processing is executed, the first processor 131 generates heat. Similarly, in accordance with the execution of the second detecting processing, the second processor 132 generates heat. However, since the processing load in each processor can be suppressed by the object detecting processing being shared by the first processor 131 and the second processor 132, the total amount of heat generation is suppressed as compared with the case where a single processor is driven non-intermittently. In addition, the ratio of each of the first detecting processing and the second detecting processing to the object detecting processing can be appropriately changed by the controller 140 according to the thermal environment wherein each of the first processor 131 and the second processor 132 is disposed. Accordingly, it is possible to more appropriately suppress the generation of heat during the execution of the object detecting processing.

The timing at which the ratios of each of the first detecting processing and the second detecting processing to the object detecting processing is changed as described with reference to FIGS. 3 to 5 may be scheduled in advance according to the thermal environment wherein each of the first processor 131 and the second processor 132 is disposed, or may be changed at a timing when a prescribed condition is satisfied.

For example, as illustrated in FIG. 1, the information detecting device 101 may include a temperature detector 150. The temperature detector 150 is configured to acquire a first operating temperature T1 of the first processor 131 and a second operating temperature T2 of the second processor 132. The first operating temperature T1 may be the temperature of the device package itself of the first processor 131, or may be the temperature of a location where the first processor 131 is disposed. The second operating temperature T2 may be the temperature of the device package itself of the second processor 132, or may be the temperature of a location where the second processor 132 is disposed.

The first operating temperature T1 and the second operating temperature T2 acquired by the temperature detector 150 are inputted to the controller 140. Accordingly, the controller 140 may include an input interface for receiving the first operating temperature T1 and the second operating temperature T2. The first operating temperature T1 and the second operating temperature T2 may be in the form of digital data or in the form of analog data. In a case where the first operating temperature T1 and the second operating temperature T2 are in the form of analog data, the input interface is provided with an appropriate conversion circuit including an A/D converter.

In this case, the controller 140 may change the ratio of each of the first detecting processing and the second detecting processing to the object detecting processing based on the first operating temperature T1 and the second operating temperature T2.

As an example, in a case where the operation limiting temperature of the first processor 131 and the operation limiting temperature of the second processor 132 are the same, the controller 140 may specify which of the first processor 131 and the second processor 132 is operating at a higher temperature based on the first operating temperature T1 and the second operating temperature T2, and cause the specified processor to execute the object detecting processing.

As another example, in a case where the operation limiting temperature of the first processor 131 and the operation limiting temperature of the second processor 132 are different from each other, the controller 140 may specify which of the first processor 131 and the second processor 132 has more margin to the operation limiting temperature based on the first operating temperature T1 and the second operating temperature T2, and cause the specified processor to execute the object detecting processing.

According to such a configuration, the ratio of each of the first detecting processing and the second detecting processing to the object detecting processing can be flexibly and immediately changed according to the thermal environment wherein the first processor 131 and the second processor 132 are actually disposed. Accordingly, the above-described heat generation suppressing effect can be further enhanced.

Figure 6:
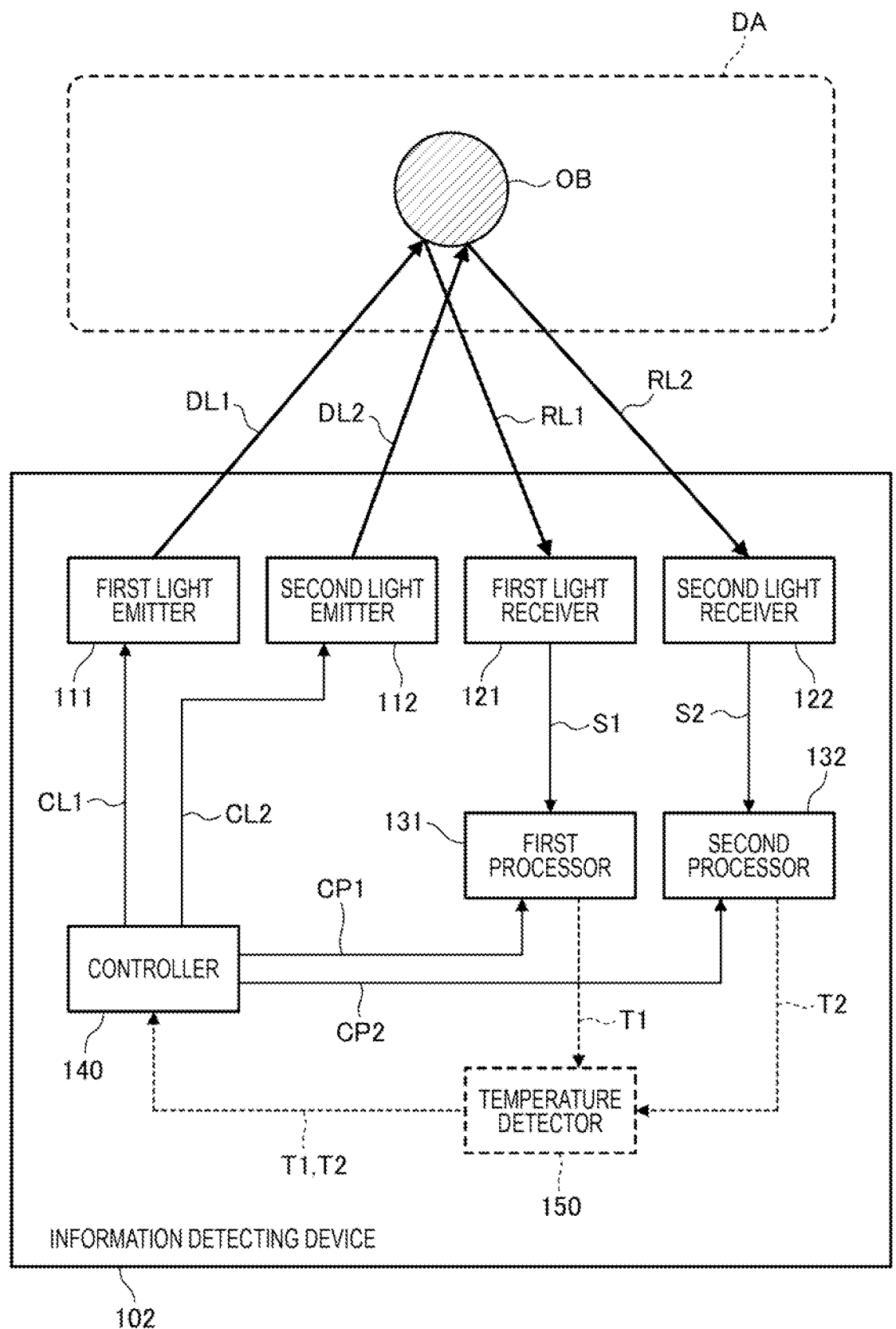
FIG. 6 illustrates a functional configuration of an information detecting device according to a second embodiment.

FIG. 6 illustrates a functional configuration of an information detecting device 102 according to a second embodiment. The information detecting device 102 is also configured to be mounted at an appropriate position in the vehicle 200 illustrated in FIG. 2. Components that are common to those of the information detecting device 101 according to the first embodiment are assigned with the same reference numerals, and repetitive descriptions for those will be omitted.

As illustrated in FIG. 6, the information detecting device 102 includes a first light emitter 111 and a second light emitter 112. The first light emitter 111 includes a light source that emits first detecting light DL1 toward the detecting area DA. The second light emitter 112 includes a light source that emits second detecting light DL2 toward the detecting area DA. The light source may be, for example, a semiconductor light emitting element that emits infrared light. Examples of the semiconductor light emitting device include a light emitting diode and a laser diode. The first detecting light DL1 and the second detecting light DL2 respectively irradiate the first sub-area SA1 and the second sub-area SA2 illustrated in FIGS. 3 to 5.

As described with reference to FIG. 3 for the light emitter 110 of the information detecting device 101 according to the first embodiment, each of the first light emitter 111 and the second light emitter 112 may also include a reflective optical system that appropriately changes the traveling direction of each of the first detecting light DL1 and the second detecting light DL2. Depending on the specification of the reflective optical system, each of the first light emitter 111 and the second light emitter 112 may include a plurality of light sources.

As illustrated in FIG. 6, the information detecting device 102 includes a first light receiver 121. When the first detecting light DL1 is reflected by an object OB located in the detecting area DA, first reflected light RL1 is generated. The first light receiver 121 includes a light receiving element that detects the first reflected light RL1. Examples of the light receiving element include a photodiode, a phototransistor, and a photo resistor. The first light receiver 121 is configured to output a first detection signal S1 corresponding to received light intensity of the first reflected light RL1. The first detection signal S1 may be an analog signal or a digital signal.

The information detecting device 102 includes a second light receiver 122. When the second detecting light DL2 is reflected by an object OB located in the detecting area DA, second reflected light RL2 is generated. The second light receiver 122 includes a light receiving element that detects the second reflected light RL2. Examples of the light receiving element include a photodiode, a phototransistor, and a photo resistor. The second light receiver 122 is configured to output a second detection signal S2 corresponding to received light intensity of the second reflected light RL2. The second detection signal S2 may be an analog signal or a digital signal.

Similarly to the light receiver 120 of the information detecting device 101 according to the first embodiment, each of the first light receiver 121 and the second light receiver 122 may also include a plurality of light receiving elements.

The first processor 131 according to the present embodiment is configured to execute the first detecting processing described above based on the first detection signal S1 outputted from the first light receiver 121.

The second processor 132 according to the present embodiment is configured to execute the above-described second detecting processing based on the second detection signal S2 outputted from the second light receiver 122.

That is, in a first cycle CY1 illustrated in FIG. 3, the first processor 131 detects the presence or absence of the reflected light RL and a time length until the reflected light RL is detected while the first detecting light DL1 scans a first sub-area SA1 located uppermost. The second processor 132 detects the presence or absence of the reflected light RL and a time length until the reflected light RL is detected while the second detecting light DL2 scans a second sub-area SA2 located below the first sub-area SA1. Similarly, the first processor 131 detects the presence or absence of the reflected light RL and a time length until the reflected light RL is detected while the first detecting light DL1 scans a first sub-area SA1 located below the second sub-area SA2. The second processor 132 detects the presence or absence of the reflected light RL and a time length until the reflected light RL is detected while the second detecting light DL2 scans a second sub-area SA2 located lowermost. The same processing is repeated also in a second cycle CY2 subsequent to the first cycle CY1.

The controller 140 according to the present embodiment includes an output interface configured to output a first light emission control signal CL1 for controlling the operation of the first light emitter 111 and a second light emission control signal CL2 for controlling the operation of the second light emitter 112. The first light emission control signal CL1 may include information indicative of a scanning position of the first detecting light DL1 in the detecting area DA. The first light emitter 111 is configured to emit the first detecting light DL1 based on the first light emission control signal CL1. The second light emission control signal CL2 may include information indicative of a scanning position of the second detecting light DL2 in the detecting area DA. The second light emitter 112 is configured to emit the second detecting light DL2 based on the second light emission control signal CL2.

Each of the first light emission control signal CL1 and the second light emission control signal CL2 may be an analog signal or a digital signal. In a case where each of the first light emission control signal CL1 and the second light emission control signal CL2 is an analog signal, the output interface of the controller 140 is provided with an appropriate conversion circuit including a D/A converter.

The controller 140 according to the present embodiment is also configured to be able to change the ratio of each of the first detecting processing and the second detecting processing to the object detecting processing. Specifically, the controller 140 changes a ratio of each of the first sub-area SA1 and the second sub-area SA2 to the detecting area DA.

As the first detecting light DL1 used in the first detecting processing is emitted, the first light emitter 111 generates heat. Similarly, in accordance with the emission of the second detecting light DL2 used in the second detecting processing, the second light emitter 112 generates heat. However, since the operation load in each light emitter can be suppressed by the supply of the detecting light being shared by the first light emitter 111 and the second light emitter 112, the total amount of heat generation is suppressed as compared with the case where a single light emitter is driven non-intermittently. Accordingly, it is possible to further suppress the generation of heat during the execution of the object detecting processing.

In order to further enhance the capability of suppressing the heat generation, a cooling device such as a Peltier element, a heat pipe, an air cooling fan, or the like may be disposed in the vicinity of each of the first processor 131 and the second processor 132.

Figure 7:
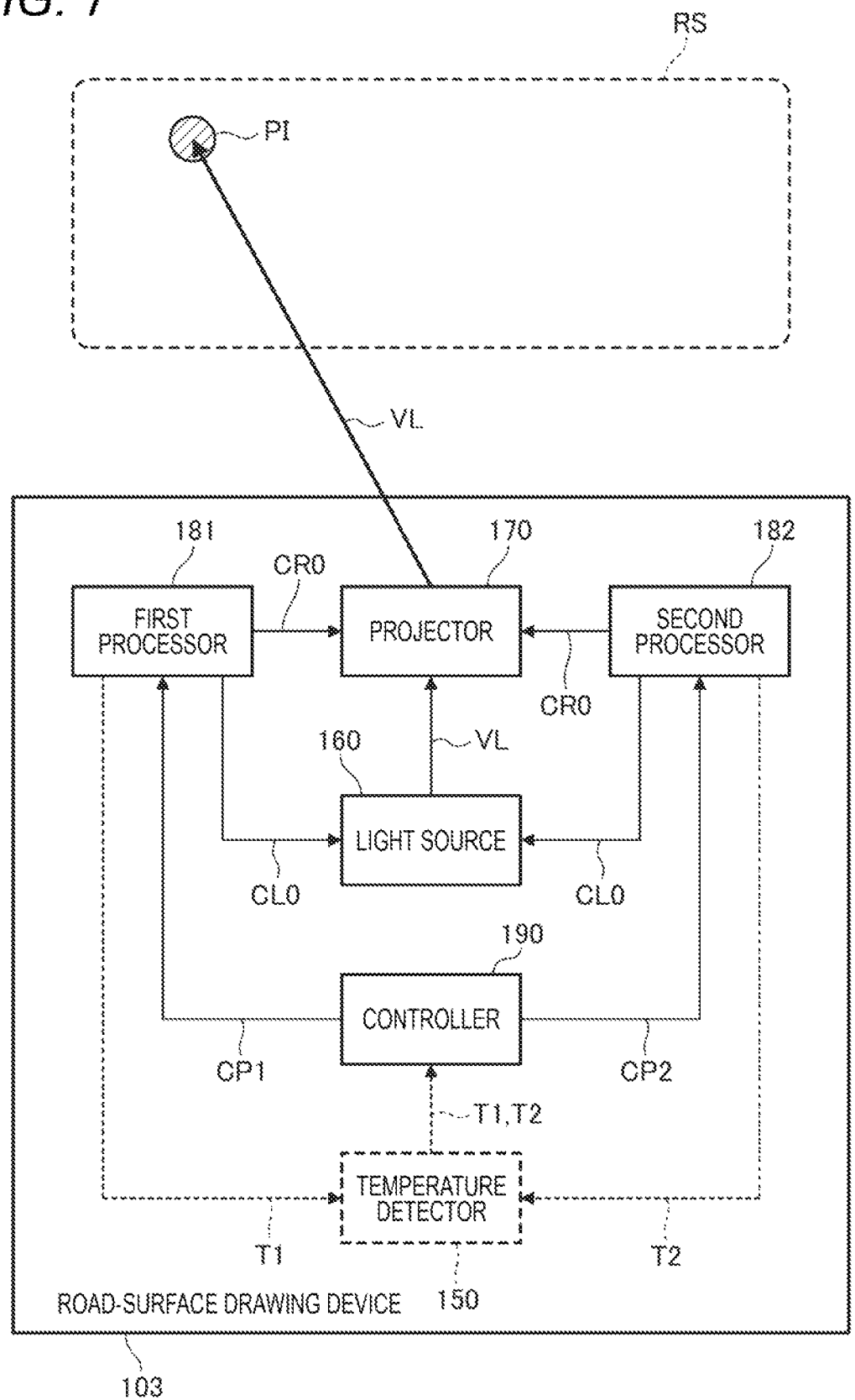
FIG. 7 illustrates a functional configuration of a road-surface drawing device according to a third embodiment.
Figure 8:
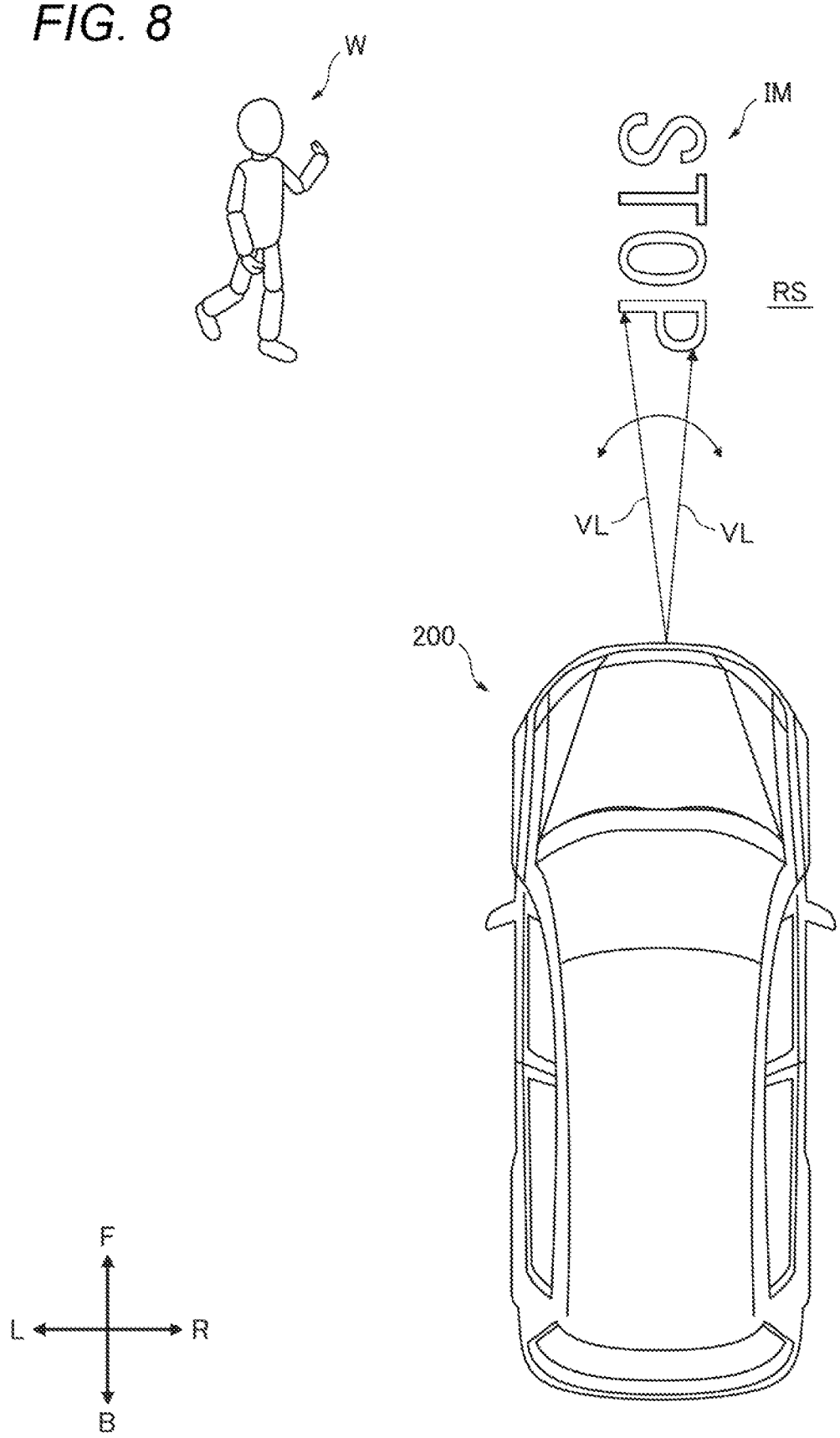
FIG. 8 illustrates a vehicle in which the road-surface drawing device of FIG. 7 is to be installed.

FIG. 7 illustrates a functional configuration of a road-surface drawing device 103 according to a third embodiment. The road-surface drawing device 103 is configured to be mounted at an appropriate position in the vehicle 200 illustrated in FIG. 8. The position is determined as a position at which a prescribed image IM can be drawn on a road surface RS located outside the vehicle 200.

As illustrated in FIG. 7, the road-surface drawing device 103 includes a light source 160. The light source 160 is configured to emit visible light VL. The wavelength of the visible light VL can be appropriately determined according to the image IM to be drawn. The light source may be a semiconductor light emitting element such as a light emitting diode, a laser diode, or an EL element.

The road-surface drawing device 103 includes a projector 170. The projector 170 includes an optical system that projects the visible light VL emitted from the light source 160 onto the road surface RS. As illustrated in FIG. 3, the detecting area DA is spreading two-dimensionally in a front-rear direction and a left-right direction. The projector 170 may include a reflective optical system that changes the traveling direction of the visible light VL in the front-rear direction and the left-right direction so that the road surface RS is two-dimensionally scanned by the visible light VL.

The configuration related to the combination of the light source 160 and the projector 170 can be appropriately changed. As an example, it is possible to adopt a configuration wherein the traveling direction of the visible light VL emitted from each of a plurality of light sources arranged in the up-down direction is changed in the left-right direction by the reflective optical system, so that the two-dimensional scanning of the road surface RS is realized. As another example, it is possible to adopt a configuration wherein the traveling direction of the visible light VL emitted from each of a plurality of light sources arranged in the left-right direction is changed in the up-down direction by the reflective optical system, so that the two-dimensional scanning of the road surface RS is realized.

Since the configuration per se for realizing the two-dimensional scanning as described above is well known, detailed descriptions thereof will be omitted.

As another example, the light source 160 may include a plurality of light sources arranged in the up-down direction and the left-right direction. The number of light sources corresponds to the resolution of the image IM to be drawn. In this case, the reflective optical system for scanning can be omitted.

As illustrated in FIG. 7, the road-surface drawing device 103 includes a first processor 181 and a second processor 182. Each of the first processor 181 and the second processor 182 is configured to execute road-surface drawing processing for drawing a prescribed image IM on a road surface RS. The drawing of the image IM can be performed by combining the on/off control of the light source 160 and the control of the projecting direction of the visible light VL executed by the projector 170. When the light source 160 is turned on, the visible light VL forms a point image PI on the road surface RS. By changing the direction of the visible light VL projected by the projector 170 at a high speed, a pedestrian or an occupant of another vehicle visually recognizes an image IM as an afterimage of the point image PI on the road surface RS. By turning off the light source 160 at an appropriate position, the shape of the image IM can be arbitrarily defined. In the example illustrated in FIG. 8, a character "STOP" that can be visually recognized by a walker W is drawn as an image IM in an area ahead of the vehicle 200.

Accordingly, as illustrated in FIG. 7, each of the first processor 181 and the second processor 182 includes an output interface capable of outputting a light emission control signal CL0 for controlling the on/off operation of the light source 160, and a projection control signal CR0 for causing the projector 170 to control the projecting direction of the visible light VL. Each of the light emission control signal CL0 and the projection control signal CR0 may be an analog signal or a digital signal. In a case where each of the light emission control signal CL0 and the projection control signal CR0 is an analog signal, the output interface is provided with an appropriate conversion circuit including a D/A converter.

Figure 9:
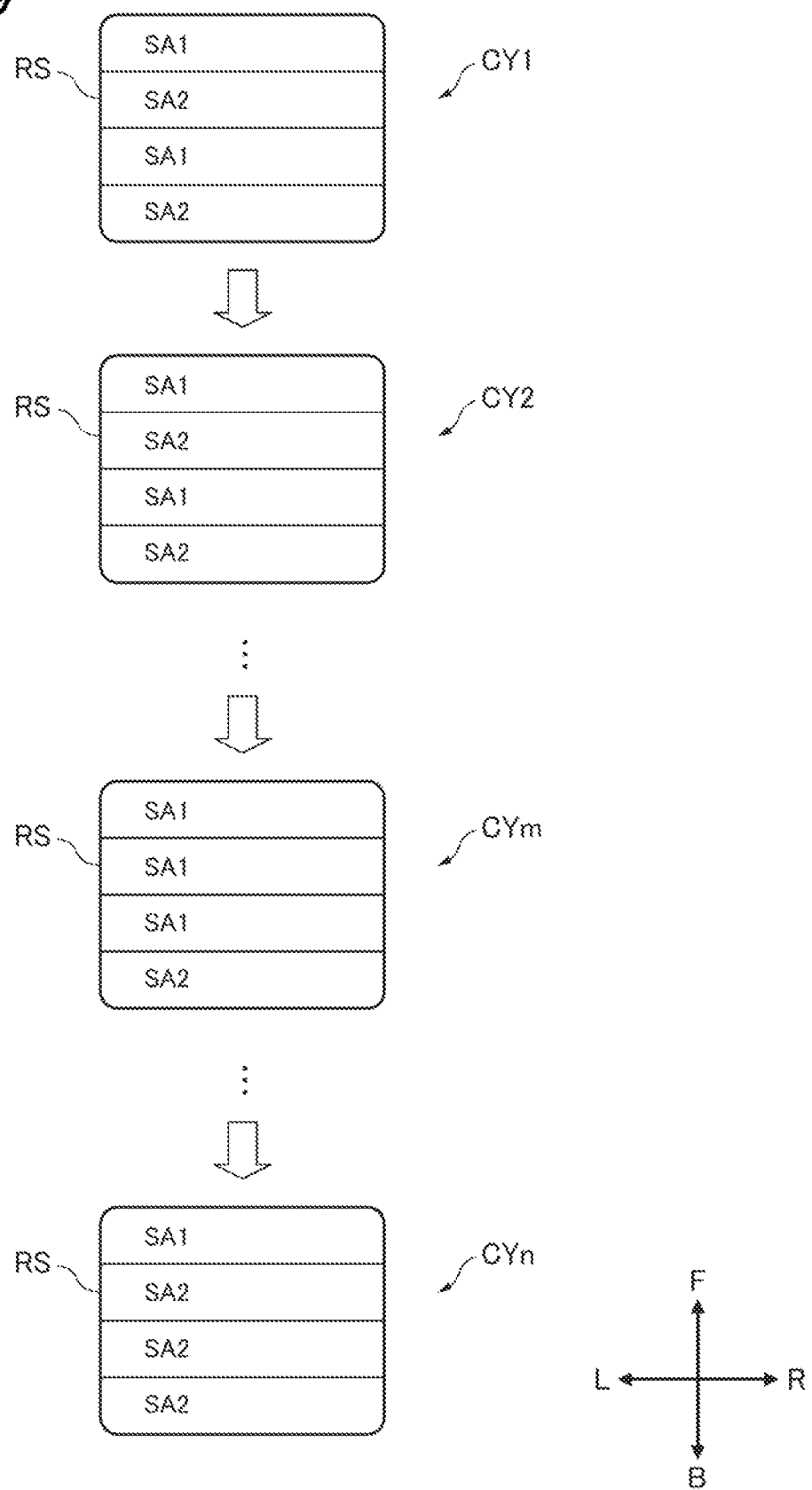
FIG. 9 illustrates an exemplary operation of the road-surface drawing device of FIG. 7.

As illustrated in FIG. 9, the road surface RS includes a first sub-area SA1 and a second sub-area SA2. The first sub-area SA1 is an area subjected to road-surface drawing processing executed by the first processor 181. The second sub-area SA2 is an area subjected to road-surface drawing processing executed by the second processor 182. In the following descriptions, the road-surface drawing processing executed by the first processor 181 will be referred to as a "first drawing processing". Similarly, the road-surface drawing processing executed by the second processor 182 is referred to as "second drawing processing". That is, each of the first drawing processing and the second drawing processing is a part of the road-surface drawing processing.

A period from the initiation to the completion of the drawing of an image IM with the visible light VL emitted from the light source 160 corresponds to one cycle of the road-surface drawing processing. By repeating plural cycles of the road-surface drawing processing for drawing the same image IM at a high speed, a still image can be visually recognized by a pedestrian or an occupant of another vehicle. By executing plural cycles of the road-surface drawing processing for drawing images IM that are different from cycle to cycle at a high speed, a moving image can be visually recognized by a pedestrian or an occupant of another vehicle.

In the first cycle CY1 illustrated in FIG. 9, the projection of the visible light VL on the first sub-area SA1 located at the foremost position and the on/off of the light source 160 are controlled by the first processor 181. The projection of the visible light VL on the second sub-area SA2 located behind the first sub-area SA1 and the on/off of the light source 160 are controlled by the second processor 182. Similarly, the projection of the visible light VL on the first sub-area SA1 located behind the second sub-area SA2 and the on/off of the light source 160 are controlled by the first processor 181. The projection of the visible light VL on the second sub-area SA2 located at the rearmost portion and the on/off of the light source 160 are controlled by the second processor 182. The same processing is repeated also in a second cycle CY2 subsequent to the first cycle CY1.

As illustrated in FIG. 7, the road-surface drawing device 103 includes a controller 190. The controller 190 includes an output interface configured to output a first processing control signal CP1 for controlling the operation of the first processor 181 and a second processing control signal CP2 for controlling the operation of the second processor 182. The first processor 181 is configured to execute the first drawing processing in response to receiving the first processing control signal CP1. The second processor 182 is configured to execute the second drawing processing in response to receiving the second processing control signal CP2.

In other words, the controller 190 outputs the first processing control signal CP1 while at least a portion of the image IM is drawn in the first sub-area SA1. Similarly, the controller 190 outputs the second processing control signal CP2 while at least a portion of the image IM is drawn in the second sub-area SA2.

The controller 190 is configured to change a ratio of each of the first drawing processing and the second drawing processing to the road-surface drawing processing. Specifically, the controller 190 changes the ratio of each of the first sub-area SA1 and the second sub-area SA2 to the road surface RS.

In the first cycle CY1 and the second cycle CY2 illustrated in FIG. 9, the ratio of each of the first sub-area SA1 and the second sub-area SA2 to the road surface RS is equal. In the m-th cycle CYm, the controller 190 increases the ratio of the first sub-area SA1 to the road surface RS. Accordingly, the ratio of the second sub-area SA2 to the road surface RS is decreased. As a result, the ratio of the first drawing processing executed by the first processor 181 to the road-surface drawing processing is made higher than the ratio of the second drawing processing executed by the second processor 182 to the road-surface drawing processing.

In the n-th cycle CYn illustrated in FIG. 9, the controller 190 increases the ratio of the second sub-area SA2 to the road surface RS. Accordingly, the ratio of the first sub-area SA1 to the road surface RS is decreased. As a result, the ratio of the second drawing processing executed by the second processor 182 to the road-surface drawing processing is made higher than the ratio of the first drawing processing executed by the first processor 181 to the road-surface drawing processing.

Figure 10:
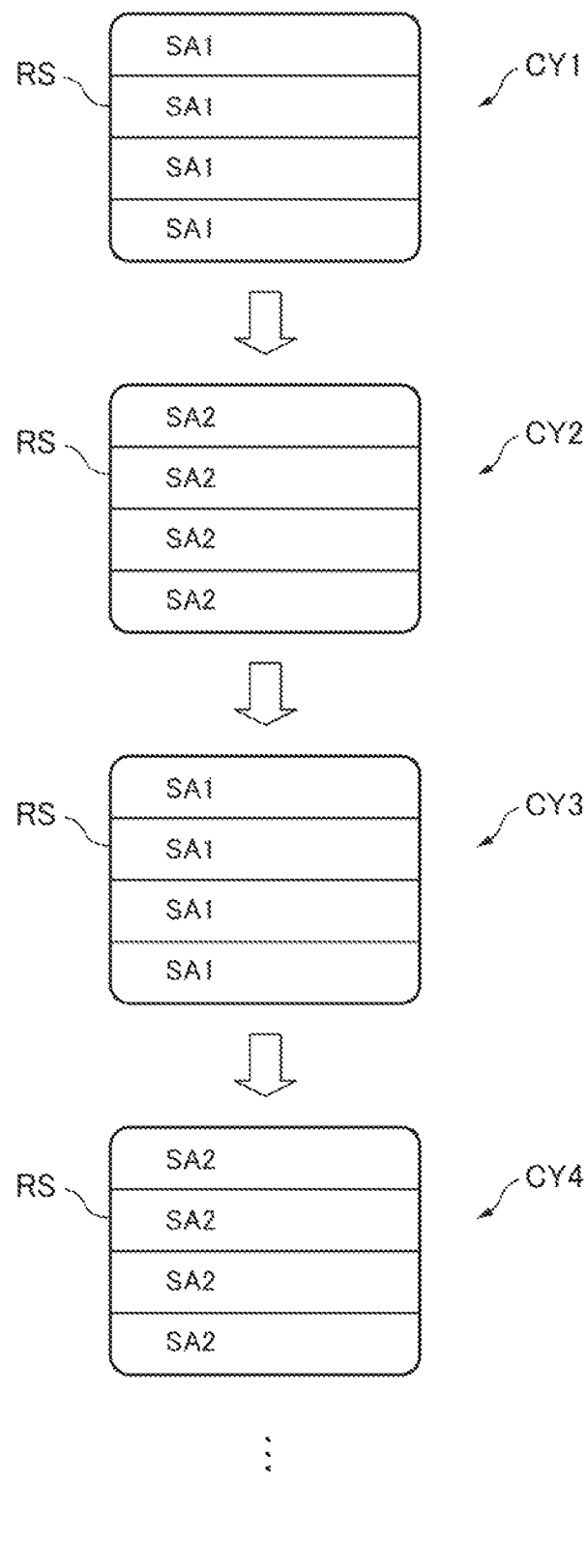
FIG. 10 illustrates another exemplary operation of the road-surface drawing device of FIG. 7.
Figure 10:
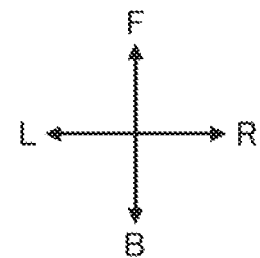

The road surface RS subjected to the road-surface drawing processing of one cycle does not necessarily have to include both the first sub-area SA1 and the second sub-area SA2. FIG. 10 illustrates another example of the ratio changing processing that can be executed by the controller 190.

In the first cycle CY1, the road surface RS includes only the first sub-area SA1. Accordingly, during the first cycle CY1, the controller 190 outputs only the first processing control signal CP1, so that only the first drawing processing with the first processor 181 is executed.

In the second cycle CY2, the road surface RS includes only the second sub-area SA2. Accordingly, during the second cycle CY2, the controller 190 outputs only the second processing control signal CP2, so that only the second drawing processing with the second processor 182 is executed.

The ratio of each of the first sub-area SA1 and the second sub-area SA2 to the road surface RS in each of the third cycle CY3 and the fourth cycle CY4 is the same as that of the first cycle CY1 and the second cycle CY2, respectively. Accordingly, in this example, the first drawing processing with the first processor 181 and the second drawing processing with the second processor 182 are alternately executed every cycle of the road-surface drawing processing.

Figure 11:
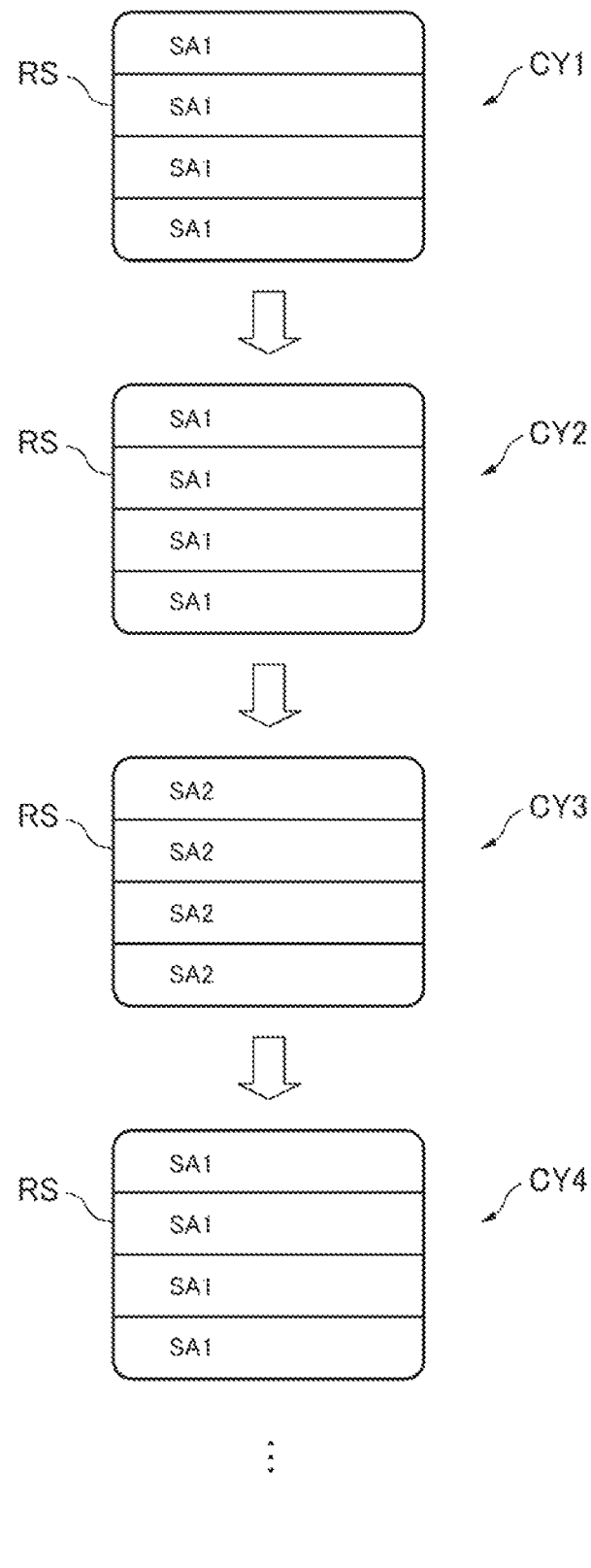
FIG. 11 illustrates another exemplary operation of the road-surface drawing device of FIG. 7.
Figure 11:
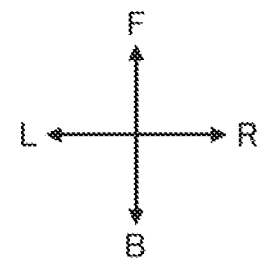

FIG. 11 illustrates another example of the ratio changing processing that can be executed by the controller 190. In this example, as a basic operation, only the first drawing processing is executed by the first processor 181 every cycle of the road-surface drawing processing. On the other hand, in a specific cycle of the road-surface drawing processing, only the second drawing processing with the second processor 182 is executed in an auxiliary manner. In this example, in the third cycle CY3, only the second drawing processing with the second processor 182 is executed. The timing at which the controller 190 executes the second drawing processing can be appropriately determined.

Each of the first processor 181, the second processor 182, and the controller 190 can be implemented by an exclusive integrated circuit including a processor capable of executing each of the above-described processing. Examples of the exclusive integrated circuit include a microcontroller, an ASIC, and an FPGA. The controller 190 may be configured to include a general-purpose microprocessor operating in conjunction with a general-purpose memory. Examples of the general-purpose microprocessor include a CPU, an MPU, and a GPU. Examples of the general-purpose memory include a ROM and a RAM. The first processor 181 and the second processor 182 are provided as separate device packages. The controller 190 may share a device package with one of the first processor 181 and the second processor 182.

As the first drawing processing is executed, the first processor 181 generates heat. Similarly, in accordance with the execution of the second drawing processing, the second processor 182 generates heat. However, since the processing load in each processor can be suppressed by the road-surface drawing processing being shared by the first processor 181 and the second processor 182, the total amount of heat generation is suppressed as compared with the case where a single processor is driven non-intermittently. In addition, the ratio of each of the first drawing processing and the second drawing processing to the road-surface drawing processing can be appropriately changed by the controller 190 according to the thermal environment wherein each of the first processor 181 and the second processor 182 is disposed. Accordingly, it is possible to more appropriately suppress the generation of heat during the execution of the road-surface drawing processing.

The timing at which the ratios of each of the first drawing processing and the second drawing processing described with reference to FIGS. 9 to 11 in the road-surface drawing processing is changed may be scheduled in advance according to the thermal environment wherein each of the first processor 181 and the second processor 182 is disposed, or may be changed at a timing when a prescribed condition is satisfied.

For example, as illustrated in FIG. 7, the road-surface drawing device 103 may include a temperature detector 150. The temperature detector 150 is configured to acquire a first operating temperature T1 of the first processor 181 and a second operating temperature T2 of the second processor 182. The first operating temperature T1 may be the temperature of the device package itself of the first processor 181, or may be the temperature of a location where the first processor 181 is disposed. The second operating temperature T2 may be the temperature of the device package itself of the second processor 182, or may be the temperature of a location where the second processor 182 is disposed.

The first operating temperature T1 and the second operating temperature T2 acquired by the temperature detector 150 are inputted to the controller 190. Accordingly, the controller 190 may include an input interface for receiving the first operating temperature T1 and the second operating temperature T2. The first operating temperature T1 and the second operating temperature T2 may be in the form of digital data or in the form of analog data. In a case where the first operating temperature T1 and the second operating temperature T2 are in the form of analog data, the input interface is provided with an appropriate conversion circuit including an A/D converter.

In this case, the controller 190 may change the ratio of each of the first drawing processing and the second drawing processing to the road-surface drawing processing based on the first operating temperature T1 and the second operating temperature T2.

As an example, in a case where the operation limiting temperature of the first processor 181 and the operation limiting temperature of the second processor 182 are the same, the controller 190 may specify which of the first processor 181 and the second processor 182 is operating at a higher temperature based on the first operating temperature T1 and the second operating temperature T2, and cause the specified processor to execute the road-surface drawing processing.

As another example, in a case where the operation-limiting temperature of the first processor 181 and the operation-limiting temperature of the second processor 182 are different from each other, the controller 190 may specify which of the first processor 181 and the second processor 182 has more margin to the operation-limiting temperature based on the first operating temperature T1 and the second operating temperature T2, and cause the specified processor to execute the road-surface drawing processing.

According to such a configuration, the ratio of each of the first drawing processing and the second drawing processing to the road-surface drawing processing can be flexibly and immediately changed according to the thermal environment wherein the first processor 181 and the second processor 182 are actually placed. Accordingly, the above-described heat generation suppressing effect can be further enhanced.

Figure 12:
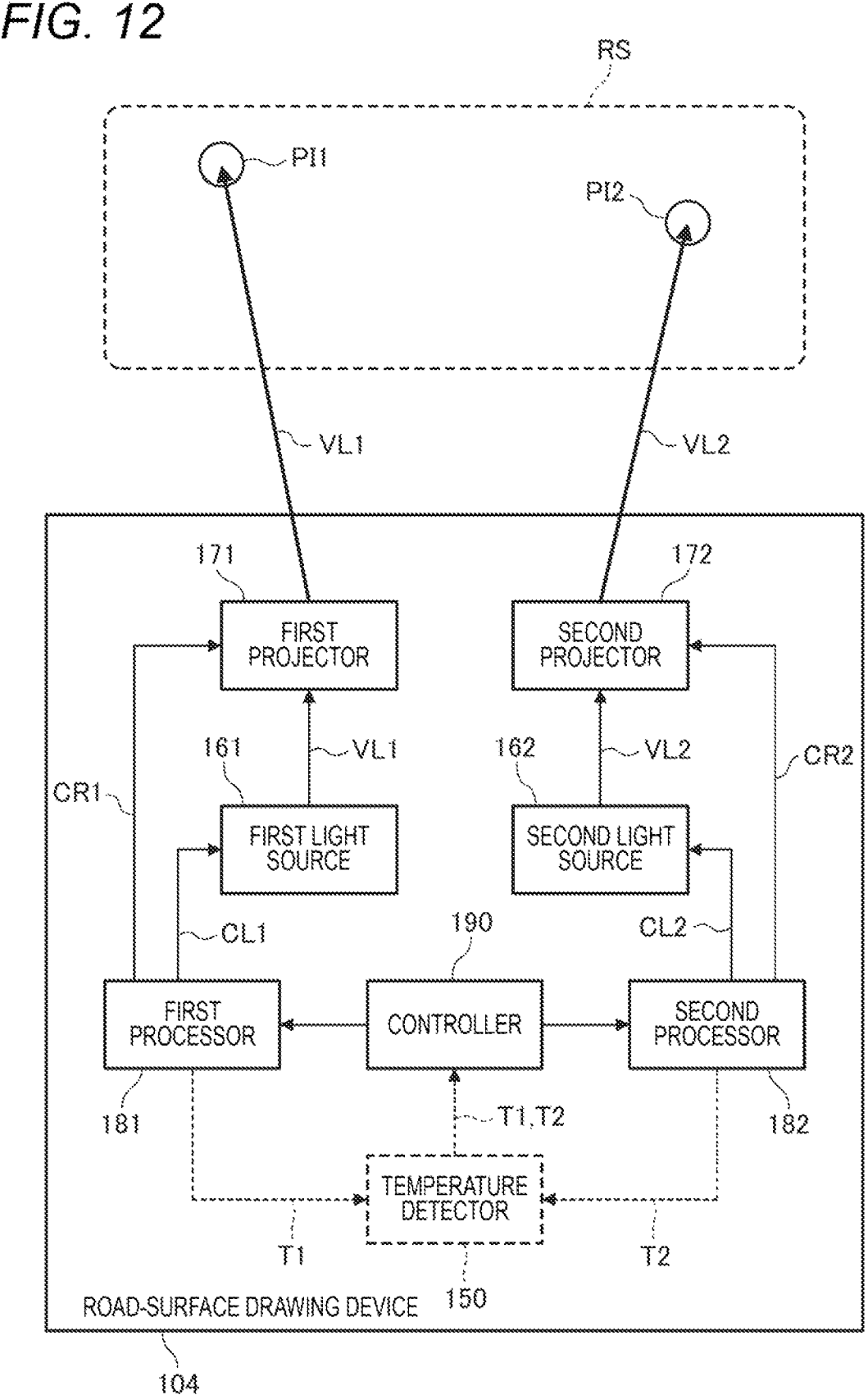
FIG. 12 illustrates a functional configuration of a road-surface drawing device according to a fourth embodiment.

FIG. 12 illustrates a functional configuration of a road-surface drawing device 104 according to a fourth embodiment. The road-surface drawing device 104 is also configured to be mounted at an appropriate position in the vehicle 200 illustrated in FIG. 8. Components that are common to those of the road-surface drawing device 103 according to the third embodiment are assigned with the same reference numerals, and repetitive descriptions for those will be omitted.

As illustrated in FIG. 12, the road-surface drawing device 104 includes a first light source 161 and a second light source 162. The first light source 161 and the second light source 162 are configured to emit the first visible light VL1 and the second visible light VL2, respectively. The wavelengths of the first visible light VL1 and the second visible light VL2 can be appropriately determined according to the image IM to be drawn. Each of the first light source 161 and the second light source 162 may be a semiconductor light emitting element such as a light emitting diode, a laser diode, or an EL element.

The road-surface drawing device 104 includes a first projector 171 and a second projector 172. The first projector 171 is configured to project the first visible light VL1 emitted from the first light source 161 to the first sub-area SA1 on the road surface RS illustrated in FIGS. 9 to 11. The second projector 172 is configured to project the second visible light VL2 emitted from the second light source 162 to the second sub-area SA2 on the road surface RS.

As described with reference to FIG. 9 for the light source 160 and the projector 170 of the road-surface drawing device 103 according to the third embodiment, the configuration related to the combination of the first light source 161 and the first projector 171, as well as the configuration related to the combination of the second light source 162 and the second projector 172 can also be appropriately changed.

The first processor 181 according to the present embodiment is configured to execute the first drawing processing described above by controlling the on/off of the first light source 161 and the direction of the first visible light VL1 projected by the first projector 171. When the first light source 161 is turned on, the first visible light VL1 forms a first point image PI1 on the road surface RS. By changing the direction of the first visible light VL1 projected by the first projector 171 at a high speed, a pedestrian or an occupant of another vehicle visually recognizes at least a part of the image IM as an afterimage of the first point image PI1 on the road surface RS.

The second processor 182 according to the present embodiment is configured to execute the above-described second drawing processing executed by controlling the on/off of the second light source 162 and the direction of the second visible light VL2 projected by the second projector 172. When the second light source 162 is turned on, the second visible light VL2 forms a second point image PI2 on the road surface RS. By changing the direction of the second visible light VL2 projected by the second projector 172 at a high speed, a pedestrian or an occupant of another vehicle visually recognizes at least a part of the image IM as an afterimage of the second point image PI2 on the road surface RS.

Accordingly, in the first cycle CY1 illustrated in FIG. 9, the projection of the first visible light VL1 on the first sub-area SA1 located at the foremost position and the on/off of the first light source 161 are controlled by the first processor 181. The projection of the second visible light VL2 on the second sub-area SA2 located behind the first sub-area SA1 and the on/off of the second light source 162 are controlled by the second processor 182. Similarly, the projection of the first visible light VL1 on the first sub-area SAT located behind the second sub-area SA2 and the on/off of the first light source 161 are controlled by the first processor 181. The projection of the second visible light VL2 on the second sub-area SA2 located at the rearmost position and the on/off of the second light source 162 are controlled by the second processor 182. The same processing is repeated also in a second cycle CY2 subsequent to the first cycle CY1.

The controller 190 according to the present embodiment includes an output interface configured to output a first light emission control signal CL1 for controlling the operation of the first light source 161 and a second light emission control signal CL2 for controlling the operation of the second light source 162. The first light emission control signal CL1 may include information indicative of a scanning position of the first visible light VL1 on the road surface RS. The first light source 161 is configured to emit the first visible light VL1 based on the first light emission control signal CL1. The second light emission control signal CL2 may include information indicative of a scanning position of the second visible light VL2 on the road surface RS. The second light source 162 is configured to emit the second visible light VL2 based on the second light emission control signal CL2.

Each of the first light emission control signal CL1 and the second light emission control signal CL2 may be an analog signal or a digital signal. In a case where each of the first light emission control signal CL1 and the second light emission control signal CL2 is an analog signal, the output interface of the controller 190 is provided with an appropriate conversion circuit including a D/A converter.

The controller 190 according to the present embodiment is also configured to be able to change the ratio of each of the first drawing processing and the second drawing processing to the road-surface drawing processing. Specifically, the controller 190 changes the ratio of each of the first sub-area SA1 and the second sub-area SA2 to the road surface RS.

As the first visible light VL1 used in the first drawing processing is emitted, the first light source 161 generates heat. Similarly, in accordance with the emission of the second visible light VL2 used in the second drawing processing, the second light source 162 generates heat. However, since the operation load in each light source can be suppressed by the supply of the visible light being shared by the first light source 161 and the second light source 162, the total amount of heat generation is suppressed as compared with the case where a single light emitter is driven nonintermittently. Accordingly, it is possible to further suppress the generation of heat during the execution of the road-surface drawing processing.

In order to further enhance the capability of suppressing the heat generation, a cooling device such as a Peltier element, a heat pipe, an air cooling fan, or the like may be disposed in the vicinity of each of the first processor 181 and the second processor 182.

The above embodiments are merely illustrative to facilitate understanding of the presently disclosed subject matter. The configuration according to each of the above embodiments can be appropriately modified or improved without departing from the gist of the presently disclosed subject matter.

In the information detecting device 101 according to the first embodiment and the information detecting device 102 according to the second embodiment, the first sub-area SA1 in the detecting area DA subjected to the first detecting processing with the first processor 131 and the second sub-area SA2 in the detecting area DA subjected to the second detecting processing with the second processor 132 may partially overlap.

In the road-surface drawing device 103 according to the third embodiment and the road-surface drawing device 104 according to the fourth embodiment, the first sub-area SA1 in the road surface RS subjected to the first drawing processing with the first processor 181 and the second sub-area SA2 in the road surface RS subjected to the second drawing processing with the second processor 182 may partially overlap.

The mobile entity on which the information detecting device and the road-surface drawing device as described above are installed is not limited to the vehicle 200. Examples of other mobile entities include railways, flying objects, aircrafts, and ships. The mobile entity may not require a driver.

Figure 13:
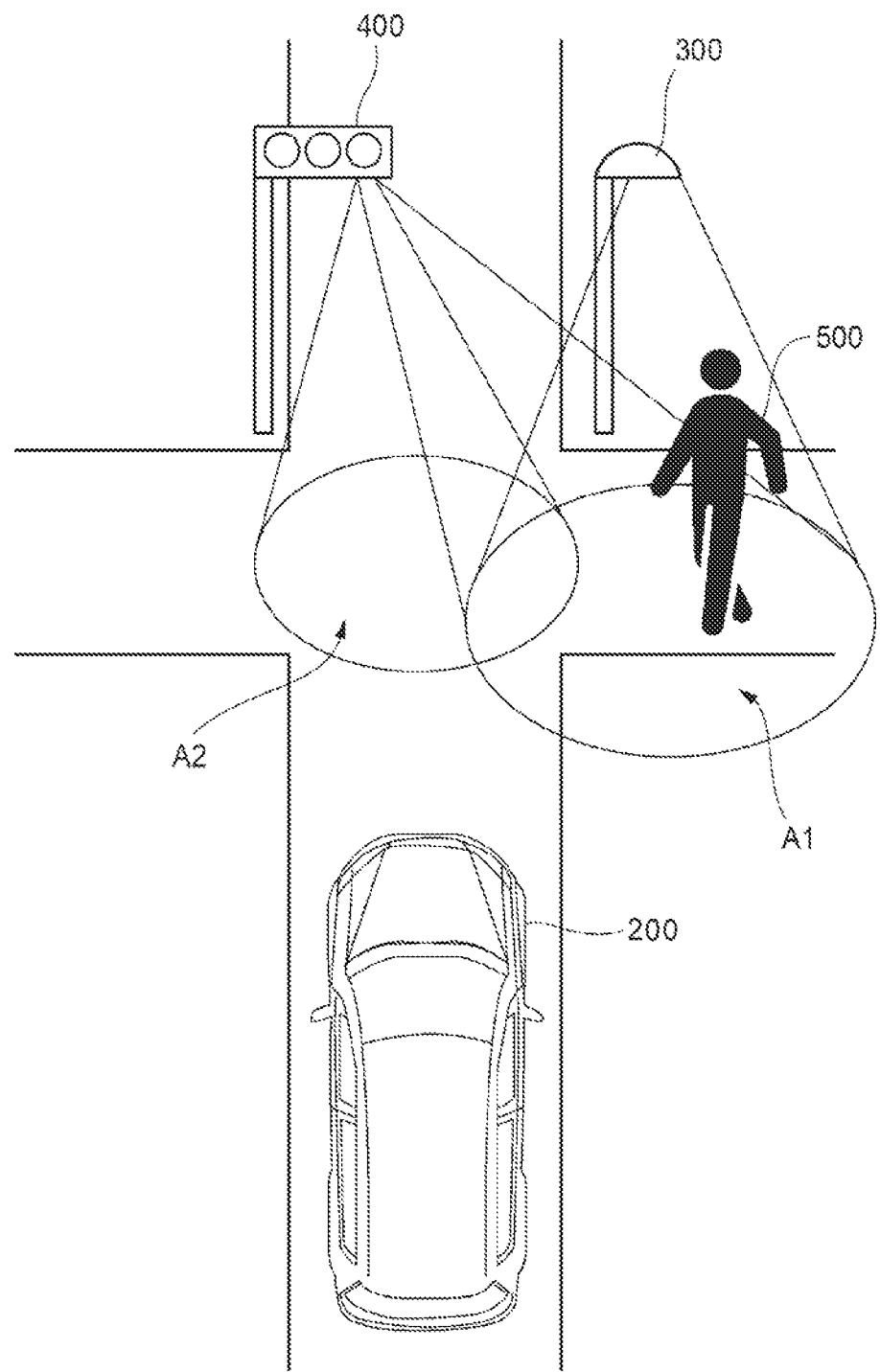
FIG. 13 illustrates a case where the information detecting device and the road-surface drawing device are installed in traffic infrastructure equipment.

The information detecting device and the road-surface drawing device as described above need not be installed in a mobile entity. As illustrated in FIG. 13, each of the information detecting device and the road-surface drawing device may be installed in traffic infrastructure equipment such as a street lamp 300 and a traffic light 400. In this case, the traffic infrastructure equipment may be an example of the monitoring device.

In a case where the information detecting device is installed in the street lamp 300, a pedestrian 500 or a vehicle located in an area A1 can be detected. That is, the detecting area DA illustrated in FIGS. 1 and 6 is defined in the area A1. For example, when it is detected that the pedestrian 500 or the vehicle is about to enter an intersection, the information can be notified, via communication, to a vehicle 200 that is about to enter the intersection from another direction.

For example, the notification can be made by a road-surface drawing device installed in the traffic light 400. That is, the area A2 is defined on the road surface RS illustrated in FIGS. 7 and 12.

Both the information detecting device and the road-surface drawing device may be installed in either the street lamp 300 or the traffic light 400. Alternatively, the information may be notified by the road-surface drawing device installed in the street lamp 300 based on the detection result by the information detecting device installed in the traffic light 400.

The present application is based on Japanese Patent Application No. 2020-125574 filed on Jul. 22, 2020, the entire contents of which are incorporated herein by reference.

The invention claimed is:

1. An information detecting device adapted to be installed in a monitoring device, comprising:
   at least one light emitter configured to emit detecting light to a detecting area located outside the monitoring device;
   at least one light receiver configured to detect reflected light that is generated in accordance with reflection of the detecting light by an object located in the detecting area;
   a first processor capable of executing first detecting processing that is a part of information detecting processing for detecting information of the object based on the reflected light;
   a second processor capable of executing second detecting processing that is a part of the information detecting processing, and is at least partially different from the first detecting processing; and
   a controller configured to change a ratio of each of the first detecting processing and the second detecting processing to the information detecting processing;
   wherein the at least one light emitter includes a first light emitter configured to emit first detecting light to the detecting area and a second light emitter configured to emit second detecting light to the detecting area;
   wherein the at least one light receiver includes a first light receiver configured to detect first reflected light that is generated in accordance with reflection of the first detecting light by the object and a second light receiver configured to detect second reflected light that is generated in accordance with reflection of the second detecting light by the object;
   wherein the first detecting processing is processing for detecting the information of the object based on the first reflected light; and
   wherein the second detecting processing is processing for detecting the information of the object based on the second reflected light.

2. The information detecting device according to claim 1, further comprising:
   a temperature detector configured to detect a first operating temperature of the first processor and a second operating temperature of the second processor,
   wherein the controller is configured to change the ratio based on the first operating temperature and the second operating temperature.

3. The information detecting device according to claim 1, wherein the monitoring device is a mobile entity.

4. A road-surface drawing device adapted to be installed in a monitoring device, comprising:
   at least one light source configured to emit visible light;
   a projector configured to project the visible light on a road surface located outside the monitoring device;
   a first processor capable of executing first drawing processing that is a part of road-surface drawing processing for controlling on/off of the light source and a projecting direction of the visible light;
   a second processor capable of executing second drawing processing that is a part of the road-surface drawing processing, and is at least partially different from the first drawing processing; and
   a controller configured to change a ratio of each of the first drawing processing and the second drawing processing to the road-surface drawing processing.

5. The road-surface drawing device according to claim 4, wherein the at least one light source includes a first light source configured to emit first visible light and a second light source configured to emit second visible light;
   wherein the first drawing processing is processing for controlling on/off of the first light source and a projecting direction of the first visible light; and
   wherein the second drawing processing is processing for controlling on/off of the second light source and a projecting direction of the second visible light.

6. The road-surface drawing device according to claim 4, further comprising:
   a temperature detector configured to detect a first operating temperature of the first processor and a second operating temperature of the second processor,
   wherein the controller is configured to change the ratio based on the first operating temperature and the second operating temperature.

7. The road-surface drawing device according to claim 4, wherein the monitoring device is a mobile entity.

* * * * *